United States Patent [19]

Herr, Jr. et al.

[11] 4,199,979
[45] Apr. 29, 1980

[54] TEST STAND

[75] Inventors: Charles H. Herr, Jr., Peoria; Alan L. McLees, Washington, both of Ill.

[73] Assignee: Caterpillar Tractor Co., Peoria, Ill.

[21] Appl. No.: 907,455

[22] Filed: May 19, 1978

[51] Int. Cl.² .............................................. G01L 5/13
[52] U.S. Cl. ....................................... 73/134; 73/118
[58] Field of Search ......................... 73/118, 134, 135; 74/11, 15.82, 15.86

[56] References Cited

U.S. PATENT DOCUMENTS

| | | | |
|---|---|---|---|
| 3,075,381 | 1/1963 | Lelis | 73/118 |
| 4,062,234 | 12/1977 | Bartlett, Jr. et al. | 73/135 |
| 4,092,855 | 6/1978 | Kinney | 73/134 |

*Primary Examiner*—Charles A. Ruehl

*Attorney, Agent, or Firm*—Wegner, Stellman, McCord, Wiles & Wood

[57] ABSTRACT

A test stand including a coupling for coupling a dynamometer to a drive sprocket of a vehicle to be tested and including a housing adapted to be rotated about an axis and having elongated guides in a plane generally transverse to the axis, at least two slides movably received in the guides, a screw shaft journalled for rotation in the housing and connected to the slides, the screw shaft being fixed against substantial longitudinal movement within the housing and, when rotated, effecting simultaneous movement of the slides towards or away from the axis, detents carried by the housing and engaging the screw shaft for holding the screw shaft against rotation, and a plurality of teeth, one for each slide, each mounted on an associated slide and extending therefrom in a direction generally parallel to the axis for receipt between the teeth of a sprocket.

7 Claims, 7 Drawing Figures

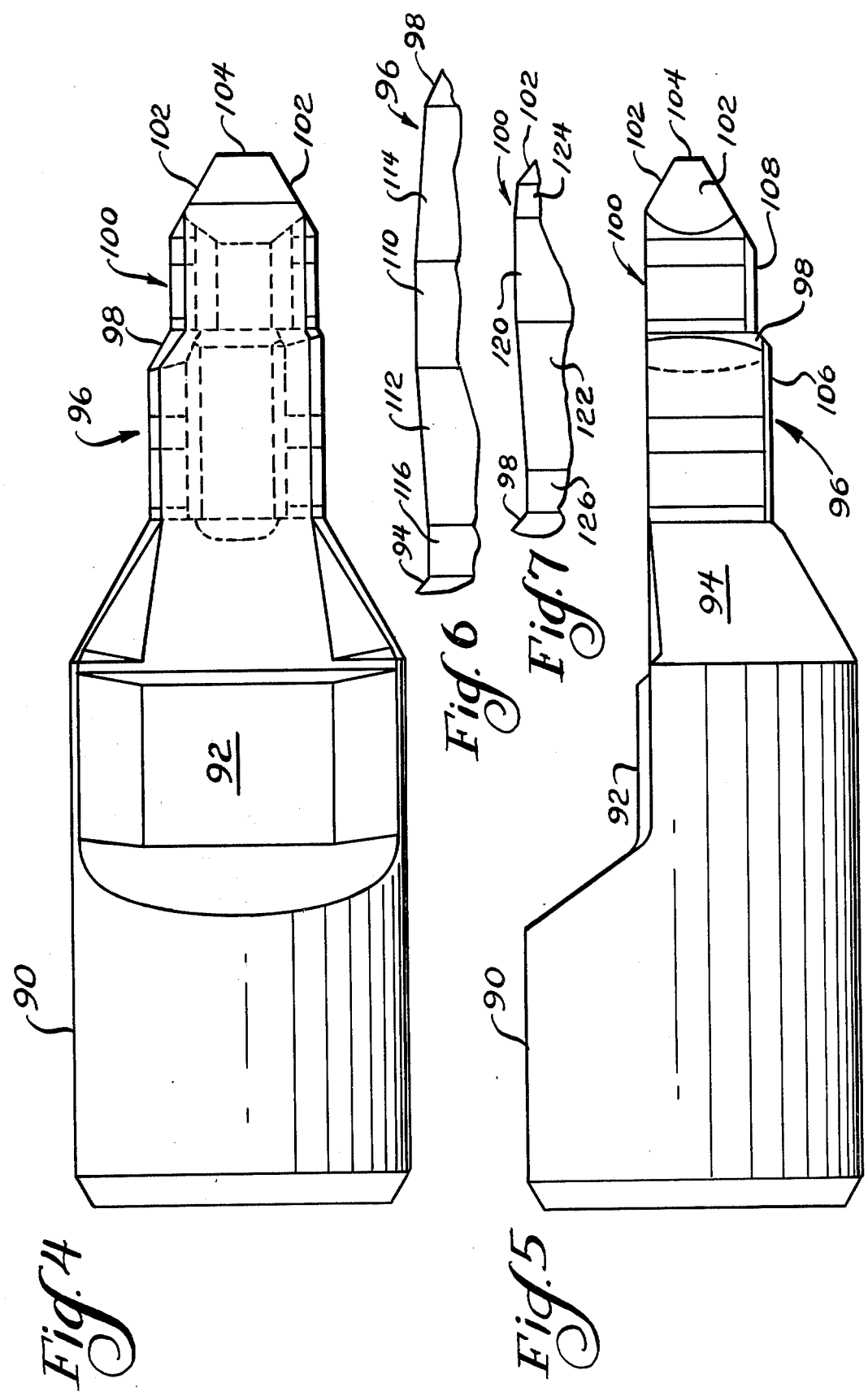

TEST STAND

BACKGROUND OF THE INVENTION

This invention relates to test stands including dynamometers for rotary outputs of mechanisms as, for example, vehicles and, more specifically, to couplings utilized for coupling dynamometers to the rotary output of the mechanism where the rotary output is in the form of a sprocket.

Manufacturers of quality mechanical powered vehicles almost invariably test the vehicle prior to releasing the same for sale to ensure that the vehicle is performing properly and is up to its rated capability. In some cases, the testing has been performed with dynamometers, while in others, the testing has been performed by other means.

Dynamometer testing is generally preferred over other forms of testing by reason of increased reliability of test results due to the elimination of subjective judgment on the part of operators and/or observers through the use of measuring apparatus. When dynamometer testing is used, there is a need to, by some means, couple the dynamometer to the rotary output of the vehicle. Dependent upon the type of vehicle, the coupling arrangement is more or less complex because of varying requirements for strength in the coupling. For example, in crawler-type vehicles, where testing is to be performed at the final drive, low rotational speeds and high torque outputs are invariably present requiring a high strength coupling.

Other factors present difficulties in the testing procedure as well as regards couplings. For example, there may be a lack of alignment between the rotary output of the vehicle and the rotary input of the test stand and means must be provided for compensating for such misalignment during the testing procedure without introducing errors of any appreciable magnitude into the test results.

Moreover, because manufacturers may provide a variety of vehicle models, any one or all of which may have rotary outputs which differ from the others in a variety of respects, a difficulty has arisen in adapting the coupling for a change in the testing procedure from one model of vehicle to another.

In the commonly assigned, copending application of Lionel L. Kinney, entitled "Dynamometer And Coupling For A Test Stand", Ser. No. 763,316, filed Jan. 28, 1977, now U.S. Pat. No. 4,092,855, there is disclosed a dynamometer construction which is quite satisfactory for use in test stands whereat crawler-type vehicles are to be tested. However, the Kinney dynamometer requires the use of a pair of spherical couplings in the rotational input for the dynamometer to provide for misalignment between the dynamometer and the vehicle to be tested. Such spherical couplings must necessarily be of high strength due to the high torques involved and, as a consequence, are quite expensive and add considerably to the cost of the dynamometer.

Moreover, in the Kinney construction, when the test stand is to be used for testing differing vehicle models, the coupling (or chuck) which couples the rotational input of the dynamometer to the vehicle must be changed.

In the commonly assigned, copending application of Charles H. Herr, entitled "Dynamometer Test Stand", Ser. No. 816,702, filed July 18, 1977, a dynamometer construction which constitutes an improvement over that disclosed by Kinney is disclosed. The Herr construction eliminates the need for two spherical couplings in the rotational input for the dynamometer and thereby considerably reduces the expense of the assembly. However, like the Kinney dynamometer, the Herr dynamometer is not readily adapted for use in testing a variety of different vehicle models without changing the coupling (or chuck) by which the dynamometer is coupled to the vehicle.

Moreover, the Herr dynamometer construction employs a coupling which shifts on the vehicle output sprocket during testing. It is necessary that sufficient tooth clearance be provided both axially and radially to prevent interference due to maximum misalignment conditions between sprocket shaft axis and dynamometer axis, and manufacturing tolerances on the sprocket. When the conditions of minimum misalignment, minimum sprocket size and low torque occur, this tooth clearance results in some noise, but tests show no detrimental effects on torque reading.

SUMMARY OF THE INVENTION

The present invention is directed to overcoming one or more of the above problems.

According to one aspect of the invention, there is provided a test stand including a base with a dynamometer having a rotary input member mounted on the base for movement such that the input member may be advanced towards or retracted from the mechanism to be tested. A coupling is carried by the input member and has two axially extending, generally radially spaced teeth which are adapted to couple with a sprocket on the mechanism to be tested.

According to one facet of this aspect of the invention, means are provided for simultaneously adjusting the radial spacing of the teeth so that the dynamometer may be coupled to sprockets of differeing sizes thereby eliminating any need for changing the coupling when the test stand is to be used in testing a variety of vehicles.

According to another facet of the foregoing aspect of the invention, the teeth include crowned coupling surfaces and universal pivot means interconnect one of the coupling and the dynamometer or the dynamometer and the base to facilitate the coupling aligning with the sprocket and prevent interference between the sprocket and the coupling teeth during shifting, when misalignment is present, from generating high stresses and/or forces.

According to still another facet of the foregoing aspect of the invention, the teeth each have a coupling surface on a line spaced from the axis of rotation of the input member so as to enable coupling of the dynamometer to a sprocket having an odd number of teeth.

According to still a further facet of the foregoing aspect of the invention, there are plural coupling surfaces on each tooth, again, for the purpose of enabling the dynamometer to be coupled to sprockets of varying tooth sizes.

According to another aspect of the invention, there is provided a coupling including a housing adapted to be rotated about an axis and having an elongated guide in a plane generally transverse to the axis. At least two slides are movably received in the guides and a screw shaft is journalled for rotation in the housing and is connected to the slides. The screw shaft is fixed against substantial longitudinal movement within the housing and, when rotated, effects simultaneous movement of the slides towards or away from the axis. Detent means are carried by the housing and engage the screw shaft for holding the screw shaft against rotation and a plurality of teeth, one for each slide, are mounted on an associated slide and extend therefrom in a direction generally parallel to the axis.

Other objects and advantages will become apparent from the following specification taken in connection with the accompanying drawings.

DESCRIPTION OF THE DRAWINGS

FIG. 4 is a plan view of a tooth employed in the coupling;

FIG. 5 is a side elevation of the tooth;

FIG. 6 is an enlarged, fragmentary view of one coupling surface utilized on the tooth; and FIG. 7 is an enlarged, fragmentary view of another coupling surface employed on the tooth.

DESCRIPTION OF THE PREFERRED EMBODIMENT

Figure 1:
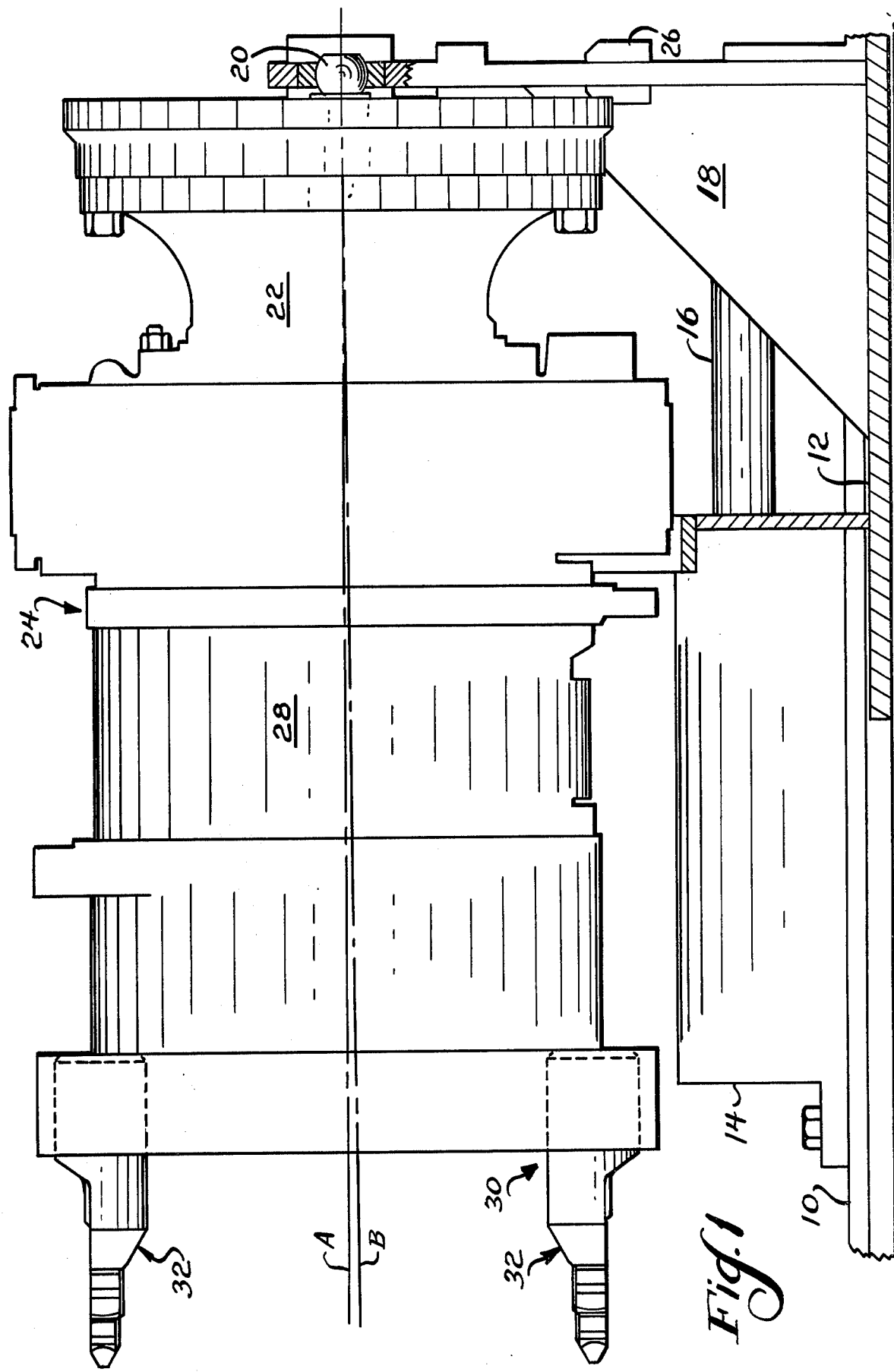
FIG. 1 is a side elevation of a dynamometer embodying a coupling made according to the invention but otherwise constructed according to the disclosure of the previously identified Herr application, the details of which are herein incorporated by reference.

An exemplary embodiment of a test stand embodying a dynamometer and having a coupling thereon made according to the invention is illustrated in FIG. 1 and, with exception of the construction of the coupling itself, is identical to that disclosed in the previously identified Herr application. The same includes a base 10 formed of spaced rails (only one of which is shown) which slidably receive, for guiding purposes, a plate 12. Hydraulic cylinders 14 (only one of which is shown) are mounted on the base 10 and have rods 16 coupled to support structure 18 on the plate 12 for moving the plate 12 and the support structure 18 from right to left and vice versa, as viewed in FIG. 1.

The support structure 18 mounts a spherical bearing 20 which, in turn, is connected to the relatively fixed part 22 of the dynamometer, generally designated 24. A load cell 26 is coupled between a force arm secured to the fixed part 22 of the dynamometer 24 and to the plate 12 in a manner disclosed by Herr.

The dynamometer 24 includes a rotatable input member or part 28 which has its axis of rotation extending through the center of the spherical bearing 20 and which mounts a coupling, generally designated 30, made according to the invention which may be engaged with the sprockets on the final drive of crawler-type vehicles prior to the assembly of the tracks thereto. The coupling 30 has a pair of axially extending teeth, generally designated 32, which are generally parallel to the axis of rotation of the input member 28.

By reason of this construction, the dynamometer 24 may be advanced to the left by the cylinders 14 to cause the teeth 32 to enter the spaces between the teeth of a sprocket on a vehicle to be tested to couple the input member 28 thereto. When misalignment exists, by reason of the universal pivotal mounting of the dynamometer 24 provided by the spherical bearing 20, skewing, as represented by the lines A and B in FIG. 1, can occur to compensate for such misalignment. As will be seen, special provision on the teeth 32 is made according to the invention to provide for smooth coupling to the gear even though the dynamometer 24 is skewed and which eliminates corner loading and possible interference between parts resulting in high stresses.

It should be recognized that while the coupling 30 is illustrated in connection with a dynamometer made according to the previously identified Herr application, and, indeed, such a construction is a preferred one, the provision in the coupling made to accomodate misalignment without the presence of large forces, is equally applicable to other constructions as, for example, a slightly modified dynamometer made according to the teachings of Kinney in the previously identified Kinney application.

For example, a coupling made according to the present invention can be utilized with a dynamometer made according to the teachings of the previously identified Kinney application with advantage and will eliminate the need for one of the spherical couplings utilized therein. Specifically, the spherical coupling utilized by Kinney and having is center designated "330" by Kinney, along with allied components may be eliminated to thereby reduce the expense of the Kinney construction.

Figure 2:
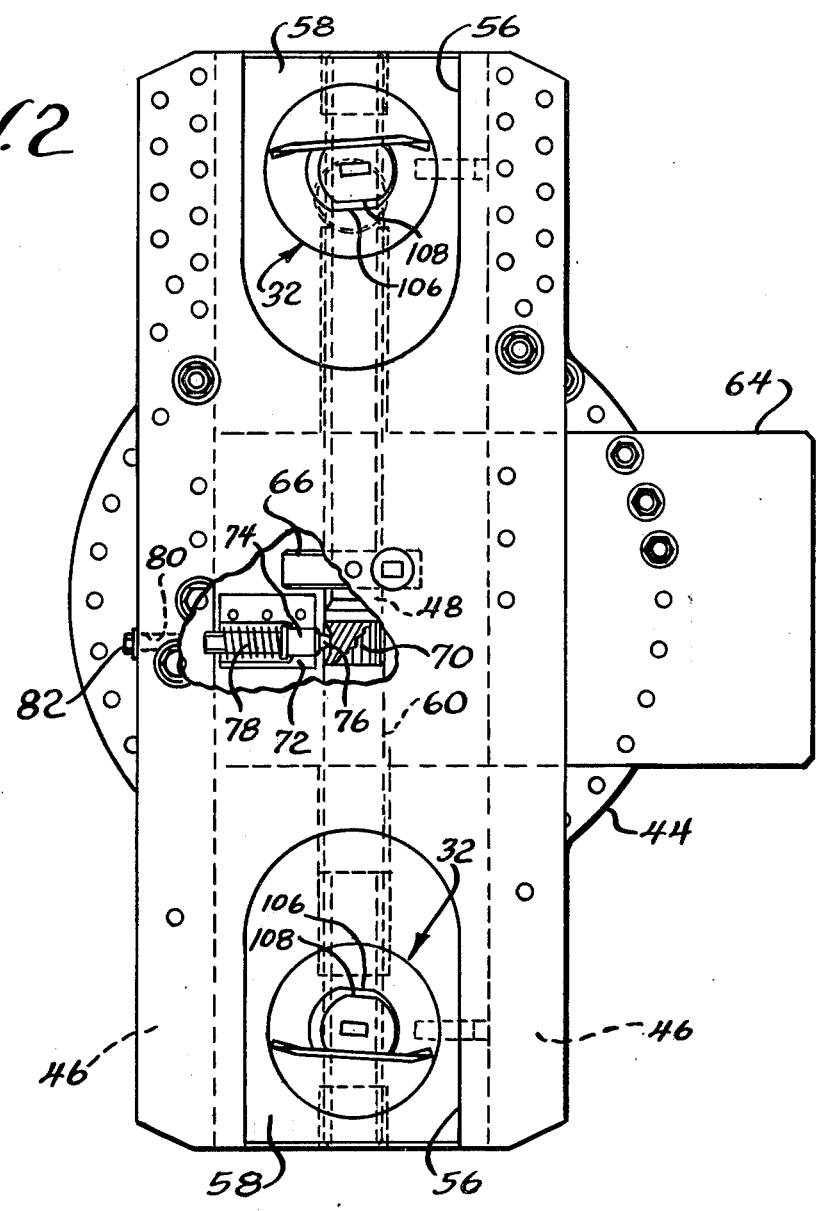
FIG. 2 is an elevational view of a coupling made according to the invention with parts broken away for clarity.
Figure 3:
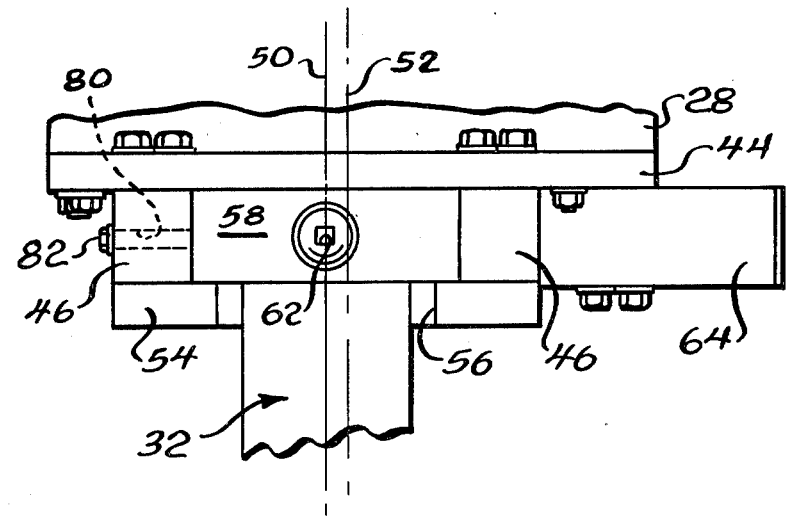
FIG. 3 is a plan view of the coupling.

The coupling 30 is secured directly to the input member 28 by studs. As seen in FIGS. 2 and 3, the coupling 30 includes a mounting plate 44 which mounts, by any suitable means, a pair of parallel, spaced elongated blocks 46. As seen in FIG. 2, the blocks 46 are not centered about the center 48 of the coupling 30, which coincides with the rotational axis of the input member 28, but rather, are shifted slightly to be centered about a line 50 displaced somewhat to the left of a line 52 which extends through the center 48.

A closure plate 54 having oppositely directed U-shaped openings 56 is secured via the blocks 46 to the mounting plate 44 with the consequence that a housing is defined wherein the blocks 46 serve as elongated guides for a pair of slides 58. An elongated screw shaft 60 is disposed between the blocks 46 and has right-hand threads on one end and left-hand threads on the other. The screw shaft 60 is threadably interconnected to the slides 58 and opposite ends thereof are provided with rectangular recesses 62 for receipt of the drive lug of, for example, a ratchet tool whereby a turning force may be applied to the shaft 60.

Because opposite ends of the shaft 60 are oppositely threaded, rotation of the shaft 60 will simultaneously move the slides 58 either towards or away from each other, dependent upon the direction of such rotation. The threads have the same pitch so that equal increments of movement of the slides 58 will occur when the shaft 60 is rotated.

The teeth 32 are mounted in the slides 58 and extend axially therefrom through the U-shaped openings 56. As a consequence, by adjusting the position of the slides 58 in a manner mentioned previously, the teeth 32 may be moved relatively radially inwardly or outwardly.

In this connection, the teeth 32 are centered on the slides 58 with respect to the line 50 and therefore are displaced from a common diameter of the input member 28 so that movement will not be truly in a radial direction. The purpose of this construction is due to the nature of the sprockets on the vehicle to which the dynamometer 24 is to be coupled. In particular, the sprockets contemplated to be engaged by the teeth 32 themselves have an odd number of teeth.

The particular coupling illustrated and the configuration of the teeth 32 to be described is adapted to couple the dynamometer 24 to sprockets having odd numbers of teeth, either 25 or 27. For differing odd numbers of teeth, the configuration could be altered appropriately in accord with the teachings herein. For an even number of teeth, the teeth 32, and quite probably the blocks 46 and the slides 58 as well would be reoriented so as to fall on a single diameter of the input member 28. Where both even and odd numbers of sprocket teeth are to be accommodated by a single coupling, the teeth 32 can be offset from the common axis of the slides 58 and the screw 60, and the common axis repositioned, so the teeth 32 will keep their relationship to the center of the input members 28 and will accommodate odd numbers of sprocket teeth. By interchanging slides 58, the teeth 32 will fall on a single diameter of input members 28 and will accommodate even numbers of sprocket teeth.

Because the teeth and the housing components are not centered and oppositely directed about the center 48 of the coupling 30, the structure will have a weight unbalance. To balance the coupling 30 a counterweight 64 is secured to the input member 28 through the plate 44 and is disposed oppositely from the line 50 with respect to the line 52, as seen in FIG. 3.

In order to ensure that the teeth 32, for all positions of adjustment, are equally spaced from the center 48 of the input member 28, means are provided for preventing substantial longitudinal movement of the screw shaft 60 within the housing. As seen in FIG. 2, a collar 66 is secured to the shaft 60 for rotation therewith. A recess (not shown) in the closure plate 54 journals the collar 66 while restricting its longitudinal movement in the direction of the axis of the shaft 60.

In order to prevent rotation of the shaft 60 when the coupling 30 is coupled to a sprocket on a vehicle, a part of the screw shaft 60 immediately adjacent to the collar 66 is provided with a series of splines or notches 70. A bored block 72 secured to plate 54 mounts a plunger 74 which terminates in a dog 76 which may enter the notches or splines 70 to prevent rotation of the shaft 60. A spring 78 bears against the plunger 74 to normally urge the dog 76 into one of the notches 70. Preferably, the configuration of the dog 76 and the notches 70 is such that when sufficient rotary force is applied to the shaft 60 by a tool or the like, the dog 76 will be cammed out of the notches 70 against the bias of the spring 78. Thus, during adjustment the plunger 74 will oscillate until the final placement of the slide 58 is achieved at which time the dog 76 will enter one of the notches 70 to prevent any further rotation of the shaft 60 when rotative force is not being applied thereto by a tool or the like.

In the event a more positive locking is required or desired, the leftmost block 46 is provided with a threaded bore 80 which is normally closed by a bolt 82. The bore 80 is aligned with the plunger 74 and to prevent leftward movement of the plunger 74, as viewed in FIG. 2, an elongated bolt may be placed in the bore 80 after the bolt 82 has been removed and will have sufficient length so as to engage the plunger 74 and prevent such leftward movement.

Turning now to FIGS. 4-7, inclusive, the nature of the teeth 32 will be described. In this connection, it should be understood that since the teeth are especially adapted for engagement with sprockets having odd numbers of teeth, the teeth 32, on opposite sides of the coupling 30, are not identical, but rather, mirror images of each other.

Each tooth 32 has an enlarged, cylindrical, butt end 90 which is received in a suitable bore in the associated slide 58 and appropriately secured in place. Immediately to the right of the butt end 90, as viewed in the Figures, there is a relief portion 92 which is provided solely for the purpose of avoiding interference with parts of the vehicle to which the coupling 30 is to be coupled. Just to the right of the relief 92 is a frustoconical section 94 which, in turn, mounts a first coupling surface, generally designated 96, which terminates in a small frustoconical section 98. The frusto-conical section 98 mounts a second coupling surface, generally designated 100, which, in turn, terminates in cam surfaces 102 which define a point 104, albeit blunt. The cam surfaces 102 are operative to cam the teeth 32 into the space between the teeth on the sprocket to be coupled to the dynamometer 24.

The radially outer surface of the teeth 32, when installed as illustrated in FIG. 1, for the sections 94, 96, 98 and 100 is flat, as best seen in FIG. 5. The radially inner surfaces of the parts 96 and 100, designated 106 and 108, respectively, are also flat and, with reference to FIG. 2, directly face the center 48 of the input member 28. That is, the surfaces 106 and 108 are perpendicular to a radius extended of the input member 28.

The purpose of the flat surfaces 106 and 108 is to avoid contact between the radially inner extremities of the teeth 32 and the bottom of the spaces between adjacent teeth of a sprocket to be engaged thereby. This configuration eliminates contact at such a location which could result in the generation of large bending forces and/or contact stresses.

It will be observed from FIGS. 4 and 6 that the overall size of the second coupling surface 100 is somewhat smaller than the first coupling surface 96. This difference is provided to allow the coupling 30 to be used with varying size sprocket teeth and is determined by the sizes of the spaces between adjacent teeth on the sprockets to be engaged by the teeth 32.

It will also be observed from FIGS. 2, 4 and 5 that the centers of the coupling surfaces 96 and 100 are staggered. This staggering is in the circumferential direction when considered with respect to the path of rotation through which the teeth 32 travel when being driven via vehicle and is for the purpose of minimizing the coupling 30 offset when coupling the dynamometer 24 to sprockets of varying diameters and having different odd numbers of teeth. The degree of staggering is, of course, dependent upon the actual number of teeth and the differing types of sprockets to be engaged by the coupling, and the amount of centrifugal force generated due to coupling offset is considered excessive. In many cases, no staggering is necessary.

It will also be observed from FIG. 5 that the body of the second coupling surface 100 is located somewhat radially outwardly of the body of the coupling surface 96. This arrangement, along with the frusto-conical section 98 linking the surfaces 96 and 100, provides for relatively smooth camming action of the teeth 32 into the space between the teeth of the sprockets with which coupling engagement is to be made when such a sprocket is to be coupled to the first coupling surfaces 96.

In order to prevent corner loading between the coupling surfaces 96 and 100 and the sides of the teeth of a sprocket to which the coupling 30 is attached when the sprocket rotational axis and the dynamometer rotational axes are misaligned, both of the coupling surfaces 96 and 100 are crowned, as illustrated in FIGS. 6 and 7. Preliminarily, it is to be understood that while the following detailed description of the surfaces 96 and 100 will speak of the various components as surfaces of revolution, they are not strictly such by reason of the presence of the radially outer flat surface as well as the presence of the flat surfaces 106 and 108 on their radially inner extremity.

The first coupling surface 96 includes a central section 110 which is cylindrical. To either side of the section 110 are frusto-conical sections 112 and 114 which have a progressively decreasing diameter as the distance from the central section 110 is increased. The frusto-conical section 114 joins to the frusto-conical section 98, while the frusto-conical section 112 joins to a cylindrical section 116 of a diameter slightly less than that of section 110 and which joins to the frusto-conical section 94. Thus, when the surface 96 is engaged with a sprocket and there is misalignment between the sprocket rotational axis of the dynamometer 24, the surface 96 will rock somewhat as the coupling 30 is rotated. However, due to the crowned nature of the surface 96 provided by the central section 110, essentially line contact will be maintained at all times and such contact will occur between the opposite ends of the central section 110. Contact will never occur with the frusto-conical sections 112 and 114 with the consequence that corner loading between the teeth 32 and the teeth on the sprocket engaged therewith will not occur.

A similar arrangement is utilized in connection with the second coupling surface 100 shown in FIG. 7. Again, a cylindrical central section 120 is employed and the same is flanked by two frusto-conical sections 122 and 124. The section 124 joints to the cam surfaces 102 while the frusto-conical section 122 joins to a reduced diameter cylindrical section 126 which, in turn, joins with the frusto-conical section 98. Again, contact will be confined to the central section 120.

Those skilled in the art will readily appreciate that in lieu of a cylindrical center section flanked by two frustoconical sections, a barrel or spherical shape could be used in lieu thereof to obtain the same results. The disclosed configuration is somewhat preferable in terms of expense of manufacture and, through wear, will ultimately assume a barrel or spherical shape.

From the foregoing, it will be appreciated that a test stand made according to the invention embodies a coupling which is readily adaptable to differeing sprockets on differing vehicle models and which does not require removal of the coupling when the test stand is changed from testing one model to another model having a differeing sprocket size. It will also be appreciated that when misalignment occurs between the rotational axis of the vehicle sprocket and the dynamometer rotational axis, the misalignment is taken up in the teeth 32 and is easily accomodated by reason of the unique, crowned configuration thereof. Consequently, expensive components heretofore required in certain prior art constructions are eliminated, while at the same time, undesirably high forces which may be generated in other prior art constructions are avoided.

The embodiments of the invention in which an exclusive property or privilege is claimed are defined as follows:

1. A test stand comprising:
a base;
a dynamometer having a rotary input member mounted on said base for movement such that said input member may be advanced toward or retracted from a mechanism to be tested;
a coupling carried by said input member and having two axially extending, generally radially spaced, teeth adapted to couple with a sprocket on the mechanism to be tested; and
means for simultaneously adjusting the radial spacing of said teeth so that said dynamometer may be coupled to sprockets of differing sizes.

2. The test stand of claim 1 wherein said teeth have cam surfaces on their ends remote from said dynamometer and further including universal pivot means interconnecting one of (a) said coupling and said dynamometer, and (b) said dynamometer and said base whereby said coupling may self-align with a sprocket.

3. The test stand of claim 1 wherein said coupling includes generally radially extending guides, and slides movably received in said guides, said teeth being mounted on respective ones of said slides and wherein said simultaneous adjusting means comprises a screw shaft interconnecting said slides.

4. A test stand comprising:
a base;
a dynamometer having a rotary input member mounted on said base for movement such that said input member may be advanced toward or retracted from a mechanism to be tested;
a coupling carried by said input member and having two axially extending, generally radially spaced, teeth adapted to couple with a sprocket on the mechanism to be tested, said teeth further including crowned coupling surfaces; and
universal pivot means interconnecting one of (a) said coupling and said dynamometer, and (b) said dynamometer and said base;
whereby said coupling may self-align with a sprocket.

5. A test stand comprising:
a base;
a dynamometer having a rotary input member mounted on said base for movement such that said input member may be advanced toward or retracted from a mechanism to be tested; and
a coupling carried by said input member and having two axially extending, generally radially spaced teeth, said teeth each having a coupling surface on a common line spaced from the axis of rotation of said input member, each of said teeth having plural, axially spaced coupling surfaces, at least one of the coupling surfaces being offset circumferentially from another coupling surface on the same tooth, and all of said coupling surfaces being crowned.

6. A test stand comprising:
a base;
a dynamometer having a rotary input member mounted on said base for movement such that said input member may be advanced toward or retracted from a mechanism to be tested;
a coupling carried by said input member and having two axially extending, generally radially spaced teeth, said teeth each having a coupling surface on a common line spaced from the axis of rotation of said input member, and a counterweight secured to said coupling.

7. A test stand comprising:
a base;

a dynamometer having a rotary input member mounted on said base for movement such that said input member may be advanced toward or retracted from a mechanism to be tested;

a coupling carried by said input member and having two axially extending, generally radially spaced, teeth adapted to couple with a sprocket on the mechanism to be tested; and at least two coupling surfaces on each of said teeth, the coupling surfaces on each tooth being axially spaced thereon and having different configurations so that said dynamometer may be coupled to sprockets of differing sizes.

* * * * *